US010071800B2

(12) United States Patent
Boros

(10) Patent No.: US 10,071,800 B2
(45) Date of Patent: Sep. 11, 2018

(54) HEAVY LIFT AIRBORNE TRANSPORT DEVICE

(71) Applicant: Jedidya L. Boros, Ranana (IL)

(72) Inventor: Jedidya L. Boros, Ranana (IL)

( * ) Notice: Subject to any disclaimer, the term of this patent is extended or adjusted under 35 U.S.C. 154(b) by 53 days.

(21) Appl. No.: 14/756,861

(22) Filed: Oct. 23, 2015

(65) Prior Publication Data

US 2017/0113794 A1    Apr. 27, 2017

(51) Int. Cl.
 B64C 29/00   (2006.01)
 B64C 27/08   (2006.01)
 B64C 25/40   (2006.01)

(52) U.S. Cl.
 CPC ............ B64C 29/00 (2013.01); B64C 25/405 (2013.01); B64C 27/08 (2013.01)

(58) Field of Classification Search
 CPC ....... B64C 23/00; B64C 23/005; B64C 27/00; B64C 27/04; B64C 27/08; B64C 29/00; B64C 35/00; B64C 29/001; B64C 29/003; B64C 29/006
 See application file for complete search history.

(56) References Cited

U.S. PATENT DOCUMENTS

| | | | | |
|---|---|---|---|---|
| 1,330,321 A * | 2/1920 | Hill | ...... | B64C 39/006 416/121 |
| 1,360,182 A * | 11/1920 | Cortes | ...... | B63H 1/04 244/70 |
| 1,460,948 A * | 7/1923 | Cortes | ...... | B63H 1/04 244/70 |
| 1,810,114 A * | 6/1931 | Smyth | ...... | B64C 39/003 244/22 |
| 1,818,116 A * | 8/1931 | Cordy | ...... | B64C 27/08 244/119 |
| 2,049,482 A * | 8/1936 | Wilson | ...... | B64C 39/006 244/39 |
| 2,133,283 A * | 10/1938 | Dandini | ...... | B64C 13/30 244/17.19 |
| 2,432,775 A * | 12/1947 | Lennon | ...... | B64C 27/04 244/17.25 |
| 2,474,079 A * | 6/1949 | Wilson | ...... | B64C 39/006 416/147 |
| 2,567,392 A * | 9/1951 | Naught | ...... | B64C 29/0025 244/23 C |
| 2,604,950 A * | 7/1952 | Sipe | ...... | B64C 39/006 244/144 |
| 2,927,746 A * | 3/1960 | Mellen | ...... | B64C 39/064 180/117 |

(Continued)

*Primary Examiner* — Tien Q Dinh
*Assistant Examiner* — Michael A. Fabula

(57) ABSTRACT

The device is capable of transporting people and goods from one location to another: it includes a circular shaped body, a uniquely designed propeller mounted on the top of the body with propeller blades that produce a low pressure region above the device, the difference between the air pressure on the bottom and the top of the device's body provides the uplift force for holding the device in the air, capable of vertical takeoff and landing; on the surrounding wall, sideways and in back, service propellers are mounted in horizontal direction to help navigate the device; land and sea landing version of the device is disclosed as well; its bottom is extended in order to keep the doors above the water level during floating.

14 Claims, 3 Drawing Sheets

(56) References Cited

U.S. PATENT DOCUMENTS

| | | | | |
|---|---|---|---|---|
| 2,947,496 A | * | 8/1960 | Leggett | B64C 29/0058 244/12.2 |
| 2,997,254 A | * | 8/1961 | Mulgrave | B64C 39/001 180/117 |
| 3,104,853 A | * | 9/1963 | Klein | B64C 29/00 244/12.2 |
| 3,135,481 A | * | 6/1964 | Sudrow | B64C 27/02 244/23 C |
| 3,199,809 A | * | 8/1965 | Modesti | B64C 29/0066 244/12.2 |
| 3,282,534 A | * | 11/1966 | Lascaris | B64C 29/00 244/12.3 |
| 3,394,906 A | * | 7/1968 | Rogers | B64C 29/0025 244/23 R |
| 3,481,559 A | * | 12/1969 | Apostolescu | B60F 3/00 244/17.23 |
| 3,514,053 A | * | 5/1970 | McGuinness | B64C 29/0066 244/12.2 |
| 3,568,955 A | * | 3/1971 | Mc Devitt | B64C 29/0066 244/23 C |
| 3,697,020 A | * | 10/1972 | Thompson | B64C 39/064 244/12.2 |
| 3,785,592 A | * | 1/1974 | Kerruish | B64C 39/064 244/12.2 |
| 3,915,411 A | * | 10/1975 | Surbaugh | B64C 29/00 244/12.2 |
| 4,202,518 A | * | 5/1980 | Burnham | B64C 11/007 244/12.1 |
| 5,046,685 A | * | 9/1991 | Bose | B64C 39/064 244/12.2 |
| 5,054,713 A | * | 10/1991 | Langley | B64C 39/06 244/12.2 |
| 5,064,143 A | * | 11/1991 | Bucher | B64C 27/10 244/12.2 |
| 5,072,892 A | * | 12/1991 | Carrington | B64C 39/001 244/12.2 |
| 5,240,204 A | * | 8/1993 | Kunz | B64C 11/007 244/12.2 |
| 5,303,879 A | * | 4/1994 | Bucher | B64C 29/0025 244/12.2 |
| 5,413,465 A | * | 5/1995 | Daniel | B63H 1/12 416/182 |
| 5,829,714 A | * | 11/1998 | Lechtenberg | B64C 39/06 244/12.2 |
| 6,371,406 B1 | * | 4/2002 | Corcoran | B64C 15/02 244/12.2 |
| 6,382,557 B1 | * | 5/2002 | Lafuma | B64B 1/00 244/12.2 |
| 6,450,446 B1 | * | 9/2002 | Holben | B64C 27/00 244/12.2 |
| 7,108,228 B1 | * | 9/2006 | Marshall | B64C 39/001 244/158.1 |
| 9,162,764 B2 | * | 10/2015 | Babinsky | B64C 39/064 |
| 2002/0014554 A1 | * | 2/2002 | Kirjavainen | B64C 27/32 244/17.11 |
| 2002/0109043 A1 | * | 8/2002 | Li | B64C 27/06 244/12.2 |
| 2004/0164203 A1 | * | 8/2004 | Billiu | B64C 29/005 244/35 R |
| 2012/0305699 A1 | * | 12/2012 | Cole | B64C 27/04 244/17.21 |
| 2013/0153706 A1 | * | 6/2013 | Lindmark | B63B 1/041 244/2 |
| 2013/0205941 A1 | * | 8/2013 | Tanose | B64C 17/06 74/572.2 |
| 2013/0206915 A1 | * | 8/2013 | Desaulniers | B64C 39/024 244/165 |
| 2015/0012154 A1 | * | 1/2015 | Senkel | B64D 17/80 701/4 |
| 2015/0239557 A1 | * | 8/2015 | Boros | B60L 11/1805 244/1 TD |
| 2016/0376002 A1 | * | 12/2016 | Davidson | B64C 39/001 244/23 A |
| 2017/0113794 A1 | * | 4/2017 | Boros | B64C 29/00 |

* cited by examiner

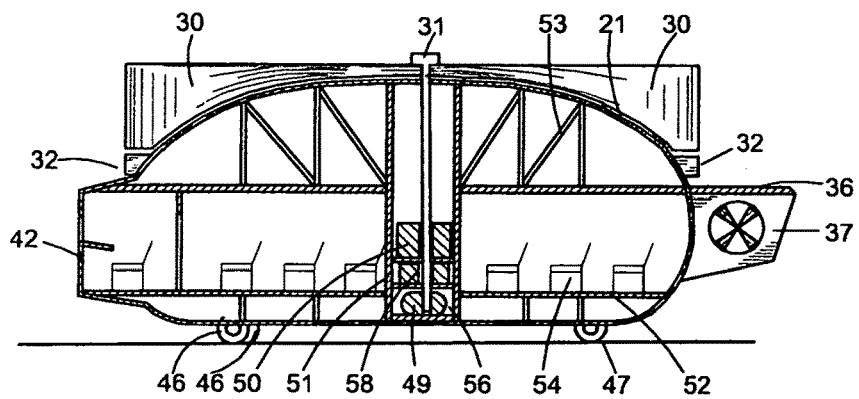
FIG.3
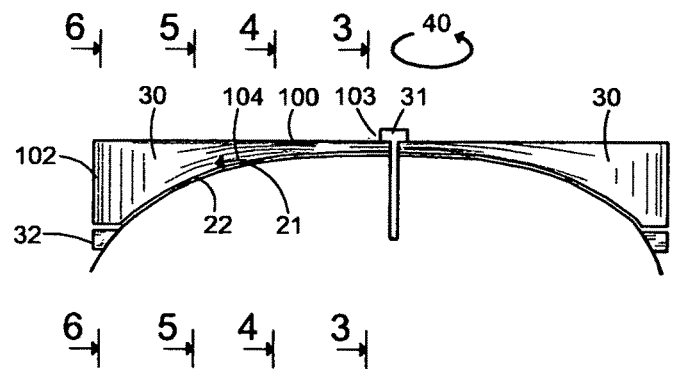
FIG.4
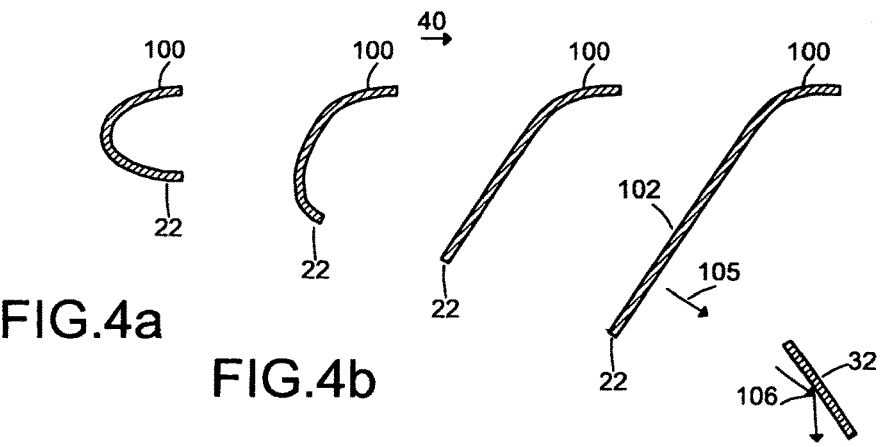
FIG.4a
FIG.4b
FIG.4c
FIG.4d

HEAVY LIFT AIRBORNE TRANSPORT DEVICE

BACKGROUND OF THE INVENTION

This invention relates generally to airborne devices and more particularly to heavy lift airborne transport devices, fit to short and medium range distance aerial transport. Conventional heavy lift airborne transport devices, such as airplanes, helicopters, airships are well known. However these conventional heavy lift airborne transport devices are not entirely satisfactory for a variety of reasons. Conventional airplanes need a long runway for takeoff and landing. Because of the required large area of land and open space most airports are located outside of cities making airplanes unfit for urban transport.

Conventional helicopters have a limited load lifting capacity. The thin rotor blades can break off causing the helicopter to fall.

Vertically take off airplanes and airships are very sensitive to weather conditions and wind shifts and have a limited load lifting capacity.

SUMMARY OF THE INVENTION

Accordingly, one objective of the present invention is to provide a new and improved heavy lift airborne transport device which is capable of vertical takeoff and landing.

Another objective of the present invention is to provide a new and improved heavy lift airborne transport device which is capable of lifting heavy loads.

Still another objective of the present invention provides a new and improved heavy lift airborne transport device capable of short distance and medium distance operation.

A further objective of the present invention is to provide a new and improved heavy lift airborne transportation device which is suitable for urban and intercity transportation.

A further objective of the present invention is to provide a new and improved heavy lift airborne transport device which is capable of carrying travelers from one location to another.

An additional objective of the present invention is to provide a new and improved heavy lift airborne transport device which is able to carry goods from one location to another.

Another objective of the present invention is to provide a new and improved heavy lift airborne transport device which is capable of sea landing. It provides a service and rescue operational device.

In accordance with the present invention, these and other objectives are obtained by providing a heavy lift airborne transport device which operates by a new aerodynamic principle. It produces a low pressure area above said heavy lift airborne transport device by pushing aside the air located above said device, producing a large uplift force on said device.

Briefly, in accordance with the present invention these and other objects are obtained by providing a heavy lift airborne transport device which includes a circular body. At the center of said body, a vertical rotation shaft is adapted. Connected to the top of said shaft are numerous specially designed propeller blades extending outward radially. Said blades have a U shaped horizontal section with the open side located in the direction of turning. The shape of said blades gradually changes outwardly to a vertically inclined surface with its forward upper region facing in the direction of the turning. The outer design of said blades is curved backward in horizontal plane to the direction of turning. Said blades are mounted quite close to the top surface of said body. By rotating said shaft the blades collect the air above said body and push the air sideways, providing a low pressure area above said body. Horizontally mounted propellers are attached on the left and right side of the wall member of said body, relative to the direction of forward movement. On the back part of the wall member of said body two horizontal propellers and one vertical propeller are mounted. There are numerous outwardly mounted vertically inclined plates mounted on the side of said body whose function is to counter balance the turning of said body produced by the rotation of the propellers located on top of said body.

At least three wheels are mounted at the bottom of said body in order to drive said device on land.

Inside, in the center of said body, is located the machinery operating said device. These include fuel tank, electric generator, and a rotating engine and other related equipment. Around the center, seats for passengers are provided. The pilot's cabin is located in the front. Windows and doors are adapted around said body.

The heavy lift airborne transport device moves forward while the propellers on the top of said body are rotating and while the propellers located at the back slightly lift up the back part of said body.

The horizontally mounted propellers on the side of the body of the heavy lift airborne transport device help in turning the device by slightly lifting up the radially outer side of the device, and help to balance the device in the case of wind blow from the side.

The heavy lift airborne transport device can be built in various dimensions:

as a small remote controlled, unmanned device used mostly for aerial photography with a 1.00 meter diameter.

as a medium size device made for transport of people and goods having a diameter of about 10.0 meters.

as a large size device with approximately a 20.0 meter diameter.

In accordance with the present invention, in addition to the land landing device a sea-land landing version of the heavy lift airborne transport device is developed. Said device is fit to sea related activity and sea rescue operation. The body of said device is higher than the only land landing version. The engine and fuel tank are located at the bottom of the device.

DESCRIPTION OF THE DRAWINGS

A more complete appreciation of the present invention and many of the attendant advantages thereof will be readily appreciated as the same becomes better understood by reference of the following detailed description when considered in connection with the accompanying drawings in which:

FIG. 3 is a section view taken along line 2-2 of FIG. 1 illustrating the internal arrangement of the heavy lift airborne transport device.

FIG. 4 is a partial side view of the oppositely located propeller blades relative to the top portion of the wall member of the body of the heavy lift airborne transport device.

FIG. 4a is a section view of said propeller blade taken along line 3-3 of FIG. 4 illustrating the shape of said propeller blade.

FIG. 4b is a section view of said propeller blade taken along line 4-4 of FIG. 4 illustrating the shape of said propeller blade FIG. 4c is a section view of said propeller blade taken along line 5-5 of FIG. 4 illustrating the shape of said propeller blade.

FIG. 4d is a section view taken along line 6-6 of said propeller blade and the rotation balancing plate members mounted on the wall member of the body of the heavy lift airborne transport device, illustrating the air flow near to the edge of the propeller blade.

DESCRIPTION OF THE PREFERRED EMBODIMENTS

Figure 1:
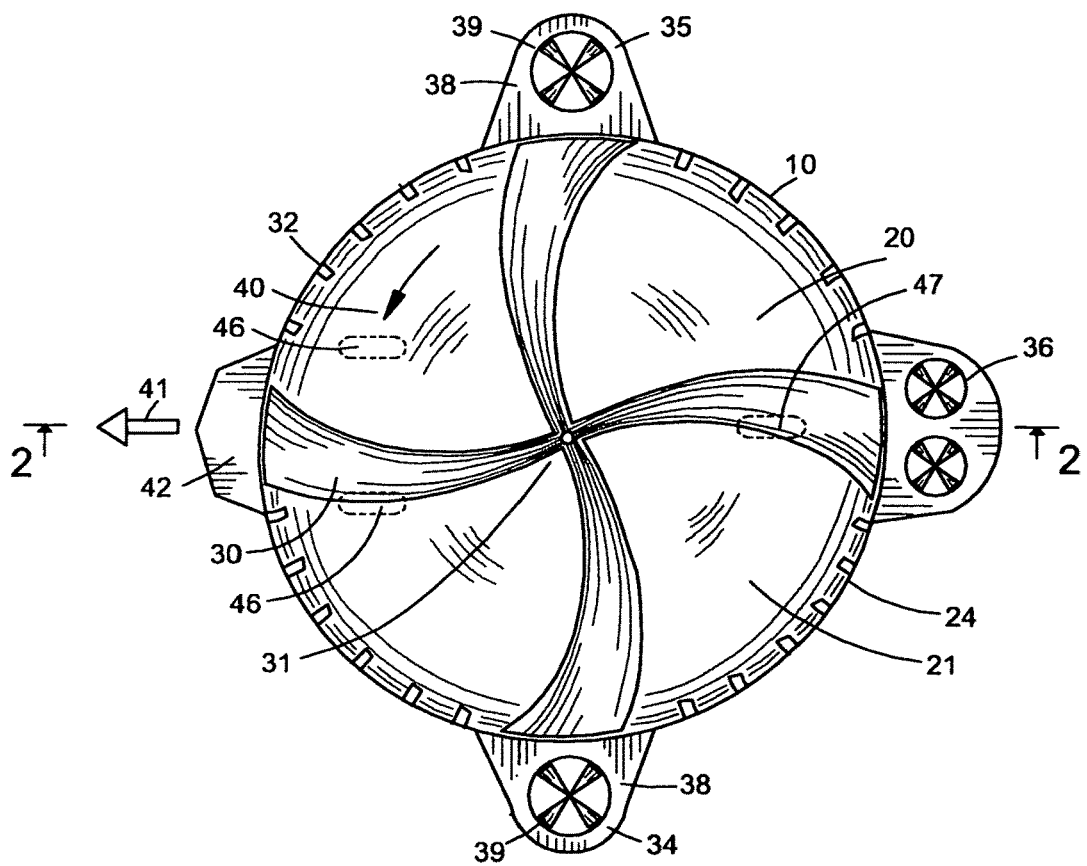
FIG. 1 is a top view of the heavy lift airborne transport device according to the present invention.

Referring now to the drawings wherein like reference characters designate identical or corresponding parts throughout the several views. Particularly to FIG. 1 of the heavy lift airborne transport device of the present invention is generally designated 10 during use in connection with flying operation.

According to the present invention, the heavy lift airborne transport device 10 includes a circular body 20. Said body 20 included an upper surface 21, a lower surface 23 shown on FIG. 2 and a wall member 24. Above the upper surface 21 of said body 20 are located several uniquely designed propeller blades 30, which rotate around a central axis 31 in the direction marked by arrow 40. The pilot's cabin 42 is located on the front of said body 20. Two propeller assemblies designated 34 and 35, diametrically opposite to each other, substantially outward in a horizontal direction are attached on the median region on both sides of wall member 24 of said body 20. Said propeller assemblies 34 and 35 each include a horizontally attached wing 38 into which a horizontally rotating propeller 39 is adapted.

On the back side of the wall member 24 of said body a horizontally mounted outwardly extended propeller assembly 36 is attached, into which two horizontally rotating propellers are mounted.

A vertical propeller assembly designated 37 is mounted under or above said horizontal propeller assembly 36, depending upon the particular application.

The pilot's cabin 42 and the back side propeller assembly designated 36 and 37 are designed in such a manner that they balance each other. The center of gravity of the device 10 remains at the center of device 10.

Along the perimeter on the upper portion of the wall member of said body radially extended torque balancing plate members are installed in an inclined direction designated 32.

Figure 2:
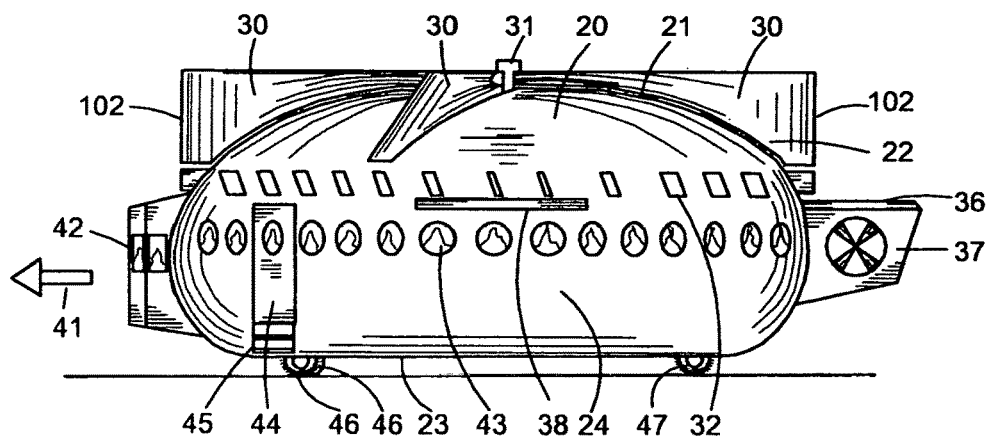
FIG. 2 is a side view of the heavy lift airborne transport device.

The particular shape of the propeller blades 30 according to the present invention can be seen in more details on FIG. 2 and FIG. 4.

Referring to FIG. 2 the heavy lift airborne transport device according to the present invention is shown in some additional details. Namely the upper surface designated 21 of said body 20 has an elliptic configuration in vertical direction which is following closely the shape of the lower region of said propeller blades designated 22. On the wall member 24 of the body 20, in a circumferential direction, windows 43 are provided. At least one or more doors 44 are installed included steps 45 leading to the doors.

At the lower surface 23 of said body 20 at least three wheels are mounted, preferably two front wheel assemblies designated 46 and one back wheel assembly 47.

The engine designated 49 shown on FIG. 3 produces the torque moment which is transferred by the central axis 31 to the propeller blades 30. They turn said blades in the direction marked by arrow 40 shown on FIG. 1. The uniquely designed propeller blades according the present invention collect the air above the roof of the heavy lift airborne transport device. They lead the collected air sideways along the curved shape of the propeller blades. This creates a low pressure region above the upper surface designated 21.

The difference in the air pressure between the upper surface 21 and the lower surface 23 of the device produces a large uplift force which holds the device in the air.

The propeller assembly designated 36 and 37 help navigate the device 10. The propeller assemblies designated 34 and 35 help balance the device 10 during turning or blowing wind.

The heavy lift airborne transport device moves forward, marked by arrow 41, after liftoff by slightly lifting up the back region of the device 10, by activating the propeller assembly designated 36. This causes a backward inclination in the device. In this manner the rotating propeller blades 30 produce an inclined air flow pushing the heavy lift airborne transport device upward and forward.

FIG. 3 illustrates the internal arrangements of the heavy lift airborne transport device according to the present invention. The pilot's cabin 42 is located at the front of the device. It provides a wide angle view for the pilot. Seats 54 can be mounted on the floor 52. The upper surface 21 is supported by a roof structure designated 53. The engine room 56 is surrounded by a wall structure 51 connecting the roof structure 53 with the floor 52 resulting in a physically strong framework for the device. The vertical section of the upper surface of said body has a preferably elliptic configuration. The fuel tank 50, the engine 49 and an electric generator 58, should preferably be located at the center of the device on the lower surface 23 of said body 20.

Referring to FIG. 4 in the preferred embodiment, the propeller blades 30 are shown in more detail. The bottom side of the propeller blades designated 22 follows the shape of the upper surface 21. Keeping only a narrow space between surface 21 and the bottom side of the propeller blades 22, the propeller blades 30 extending preferably until the perimeter of said body 20.

In the horizontal direction the propeller blades 30 curve backwards to the direction of the rotation 40 as it shown on FIG. 1, causing an air flow from the central connection of the propeller blades 103 outward. This produces a low air pressure area above the upper surface 21. The arrow 104 shows the direction of air flow.

FIG. 4a shows the shape of the propeller blades 30 near to the central connection of the propeller blades 30. The shape of the propeller blades changes gradually in the outward direction, as shown in FIG. 4b, reaching an inclined shape, as shown in FIG. 4c.

FIG. 4d illustrates the principle of air flow directed from the propeller blades 30 near to the edge 102 in the direction of the torque balancing plates 32. In addition to eliminating the torque, they direct the airflow downward as shown by arrow 105 and 106, producing additional uplift force for the heavy lift airborne transport device.

Figure 5:
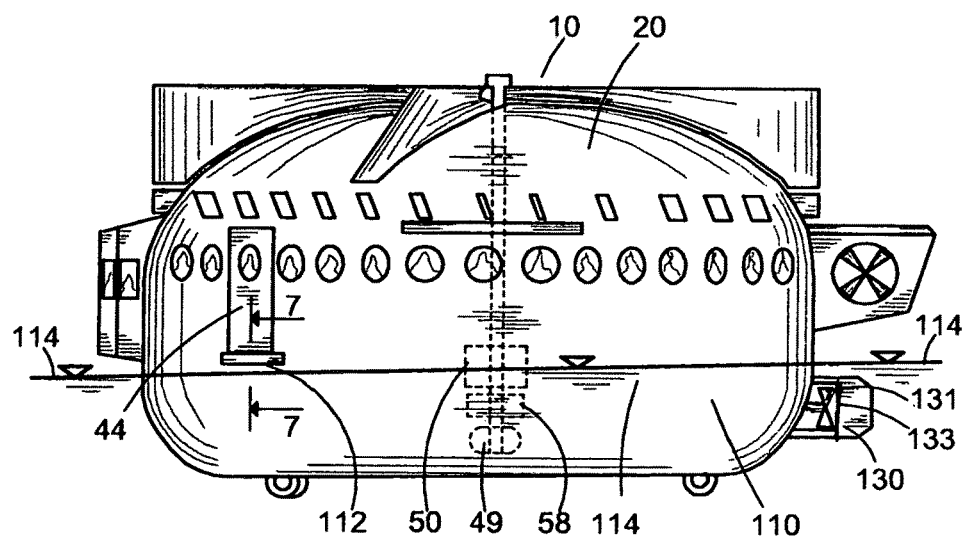
FIG. 5 is a side view of the sea and land landing version of the heavy lift airborne transport device according to the present invention.

FIG. 5 illustrates a version of the heavy lift airborne transport device capable of both sea and land landing. The body 20 extends downward, in order to keep the doors and access step assembly 112 above the water level. The water level is illustrated by mark 114. The engine 49 and fuel tank 50 and electric generator 58 are located at the bottom of the device in order to balance the device against overturning in the sea.

A backward extending pivotally mounted wing, 130 is provided at the lower back region of the body 20. It can turn left and right around a vertical axis 133, providing a steering capability for the device 10 in water.

At least one seagoing propeller 131 is mounted on said body 10 in the region of the wing 130. This creates thrust for the device 10 for maneuvering in water.

Figure 6:
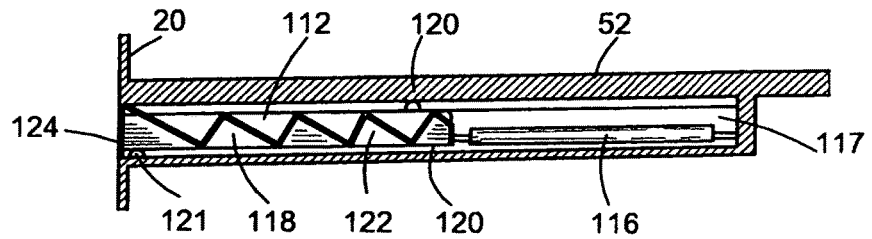
FIG. 6 is a partial section view taken along line 7-7 of FIG. 5 showing the access step assembly to the sea-land variation of the heavy lift airborne transport device in distract mode.

Referring to FIG. 6, under the floor 52 below the door 44, a slot 117 provides storage for the access step assembly 112. Said step assembly is pushed outward and pulled inward by a hydraulic jack 116 mounted in the back part of said slot.

The access step assembly 112 is built from two outwardly extended road members 118, one on each side of the step assembly. Said road members are connected by steps 122. On the front part of said road members a cover plate 124 is provided in order to close the slot 117 when the access step assembly is pulled back. For smooth operation of the access step assembly a roller 121 is mounted in the forward part of the slot 117 with numerous rollers 120 mounted on the road members 118.

Figure 6A:
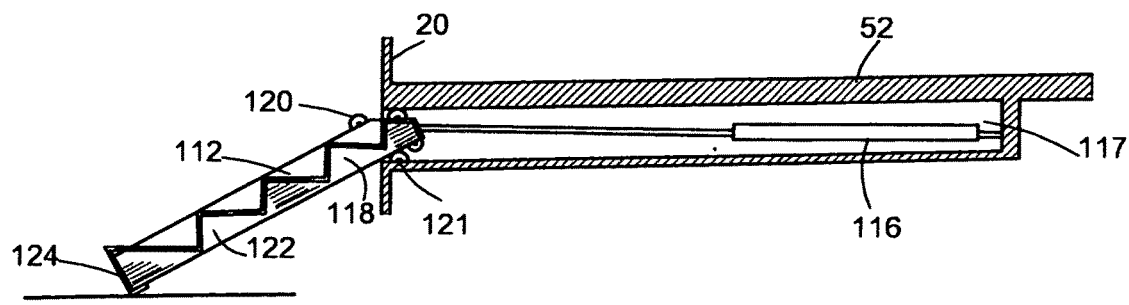
FIG. 6a is a partial section view taken along line 7-7 of FIG. 5 showing said access step assembly in an extended mode for facilitating land landing.

FIG. 6a shows the access step assembly, facilitating a land landing. The hydraulic jack 116 is shown in extended position pushing the access step assembly outward.

Obviously, numerous modifications and variations of the present invention are possible in the light of the above teachings. It is therefore to be understood, that within the scope of the appended claims, the invention may be practiced otherwise than as specifically disclosed herein.

What is claimed is:

1. A Heavy lift airborne transport device comprising:
a circular body including a lower surface, an upper surface and a wall member surrounding the perimeter of said surfaces;
a rotating shaft is adapted to the center of said body and extends above the upper region of said body;
at least two propeller blades are fixed to the upper region of the rotating shaft wherein said propeller blades in the horizontal plane have an outwardly gradually inclined curved configuration backward to the direction of rotation;
wherein said propeller blades have a U shaped configuration with the open sided located horizontally in the direction of turning at the central region of said propeller blades and gradually changes outwardly to a vertically inclined shape wherein the forward upper region of said blades are in the direction of the turning;
an engine for applying a torque to said rotating shaft.

2. The heavy lift airborne transport device as recited in claim 1 wherein a lower region of said propeller blades follows the shape of the upper surface region of said body till the perimeter of said body.

3. The heavy lift airborne transport device as recited in claim 2 wherein radially extended horizontally aligned wings are mounted diametrically opposite to the wall member of the said body; into said wings horizontally aligned propellers are mounted.

4. The heavy lift airborne transport device as recited in claim 3 wherein in the backward region of the wall member of said body, a radially extended horizontally aligned wing is mounted; into this wing horizontally aligned propeller or propellers are mounted.

5. The heavy lift airborne transport device as recited in claim 4 wherein in the backward region of the wall member of said body a radially extended vertically aligned wing is mounted; into this wing a vertically aligned propeller is mounted.

6. The heavy lift airborne transport device as recited in claim 5 wherein a pilot's cabin is located in the front of said body.

7. The heavy lift airborne transport device as recited in claim 6 wherein at the lower surface of said body at least three wheels are provided.

8. The heavy lift airborne transport device as recited in claim 7 wherein on the wall member of said body doors and windows are provided.

9. The heavy lift airborne transport device as recited in claim 8 wherein to said wall member radially extended vertically or in an inclined direction, plate members are mounted.

10. The heavy lift airborne transport device as recited in claim 9 wherein the vertical section of the top region of said body has an elliptic configuration.

11. The heavy lift airborne transport device as recited in claim 6 wherein the pilot's cabin extends forward from said body.

12. The heavy lift airborne transport device as recited in claim 8 wherein the lower region of said body is extended downward, providing land and sea operating versions of said device, said downward extension is provided in order to keep the bottom edge of said door or doors above the water level while said device is floating on the water; the engine and fuel tank are located at the lower surface of said device capable to balance said device against flipping over in water.

13. The heavy lift airborne transport device as recited in claim 12 wherein in the substantially lower region of the wall member of said body a vertically mounted wing is attached in the backward direction, capable of turning around a vertical axis.

14. The heavy lift airborne transport device as recited in claim 13 wherein in the substantially lower region of the wall member of said body at least one vertically aligned seagoing propeller is mounted in the backward direction.

* * * * *